United States Patent
Murlidar et al.

(10) Patent No.: US 9,175,977 B2
(45) Date of Patent: Nov. 3, 2015

(54) METHOD FOR ARBITRATING BETWEEN MULTIPLE VEHICLE NAVIGATION SYSTEMS

(75) Inventors: Jaycee Murlidar, Troy, MI (US); Nathan Ampunan, Novi, MI (US)

(73) Assignee: General Motors LLC, Detroit, MI (US)

( * ) Notice: Subject to any disclaimer, the term of this patent is extended or adjusted under 35 U.S.C. 154(b) by 2388 days.

(21) Appl. No.: 11/306,235

(22) Filed: Dec. 20, 2005

(65) Prior Publication Data

US 2007/0143018 A1     Jun. 21, 2007

(51) Int. Cl.
- G01C 21/00   (2006.01)
- G01C 21/34   (2006.01)
- G08G 1/123   (2006.01)
- G01C 21/36   (2006.01)

(52) U.S. Cl.
CPC .................................. *G01C 21/3688* (2013.01)

(58) Field of Classification Search
USPC ................. 701/1, 2, 200, 211, 400, 410, 420; 370/338, 401
See application file for complete search history.

(56) References Cited

U.S. PATENT DOCUMENTS

| | | | |
|---|---|---|---|
| 5,305,355 A | 4/1994 | Go et al. | |
| 5,625,350 A | 4/1997 | Fukatsu et al. | |
| 6,097,316 A | 8/2000 | Liaw et al. | |
| 6,704,646 B2 | 3/2004 | Cochlovius et al. | |
| 6,801,855 B1 | 10/2004 | Walters et al. | |
| 6,970,786 B2 * | 11/2005 | Hayama et al. | 701/450 |
| 2002/0152027 A1 | 10/2002 | Allen | |
| 2004/0128065 A1 * | 7/2004 | Taylor et al. | 701/201 |
| 2004/0150674 A1 * | 8/2004 | Takahashi et al. | 345/810 |
| 2004/0151285 A1 * | 8/2004 | Sychta | 379/88.16 |
| 2004/0185842 A1 * | 9/2004 | Spaur et al. | 455/420 |
| 2006/0036356 A1 * | 2/2006 | Rasin et al. | 701/1 |
| 2007/0140187 A1 * | 6/2007 | Rokusek et al. | 370/338 |

FOREIGN PATENT DOCUMENTS

| | | |
|---|---|---|
| DE | 19917807 | 10/1999 |
| DE | 10005878 | 8/2001 |

* cited by examiner

*Primary Examiner* — Imran Mustafa

(74) *Attorney, Agent, or Firm* — Anthony Luke Simon; Reising Ethington

(57) ABSTRACT

A method for arbitrating between vehicle navigation systems in the event that multiple systems are concurrently activated so that information is provided to a user by only one navigation system at a time. This method of arbitration reduces the possibility of user confusion that could otherwise occur if multiple vehicle navigation systems were simultaneously providing the user with information. According to one embodiment, the arbitration method is used in conjunction with a telematics-based system and a CD-based system that both provide turn-by-turn spoken driving directions. The method can also be used to arbitrate between any vehicle-based sources of electronically-supplied audio speech, particularly where the systems are connected to a common vehicle network that allows software control of the different vehicle systems.

13 Claims, 2 Drawing Sheets

METHOD FOR ARBITRATING BETWEEN MULTIPLE VEHICLE NAVIGATION SYSTEMS

TECHNICAL FIELD

The present invention relates generally to vehicle systems that provide information and/or interactivity to a vehicle driver or other occupant and, more particularly, to vehicle navigation systems that supply spoken driving directions to the driver.

BACKGROUND OF THE INVENTION

In recent years, GPS-based navigation systems have grown in popularity and are now widely available in a variety of forms, including different types of vehicle-installed units as well as hand-held portable units. These navigation systems are primarily based on a Global Positioning System (GPS) which was founded by the U.S. Department of Defense and consists of a constellation of 24 satellites working in conjunction with 5 base stations. The satellites orbit the Earth and transmit precise timing data to GPS receivers located on Earth. If strong signals from 3 or more satellites are received, then a latitude and longitude (two-dimensional) position can be determined; if strong signals from 4 or more satellites are received, then a latitude, longitude and altitude (three-dimensional) position can be calculated. Moreover, the accuracy of these navigation systems can be increased through the use of the Wide Area Augmentation System (WAAS), which monitors the satellite data through a collection of base stations and makes signal corrections to provide even more accurate position data.

The success and popularity of vehicle navigation systems has resulted in the development and sale of many different types of systems. For instance, one type of vehicle navigation system currently available is based on telematics. In general, telematics-based vehicle navigation systems utilize a combination of wireless voice and data to communicate between vehicle-installed hardware and a back-end system in order to provide a number of different navigation-related services including turn-by-turn (TBT) spoken directions. In telematics-based systems such as these, the GPS-derived position of the vehicle is compared to road-data provided by the back-end system. The road data not only includes detailed maps of the area(s) in question, but also includes information pertaining to things such as average travel speed classifications, one way streets, highway exit/entrance ramp details, etc. and because the road data is maintained and provided by the back-end system, it is easily and frequently updated. Of course, the vehicle telematics system is typically capable of performing additional, non-navigation related tasks such as those related to providing entertainment, diagnostic or safety functions.

Another type of vehicle navigation system is an autonomous vehicle navigation system mounted on-board the vehicle. These systems use road data that is stored locally at the vehicle such as on a CD or DVD. In this example, the autonomous navigation system compares the position data gathered by the GPS receiver with the road data obtained from the CD or DVD, and the system can then use this information to provide a graphical display at the instrument panel showing a map with the vehicle location. These autonomous systems also allow the driver or other occupant to input a destination address so that the navigation system can provide driving directions graphically as well as turn-by-turn spoken directions. Hence, there is no need to build and maintain a back-end system for supporting the vehicle navigation system.

Each of the aforementioned vehicle navigation systems have certain advantageous qualities, which explains why both types are presently offered on different vehicles. In fact, not only are different types of vehicle navigation systems sometimes offered on the same vehicle, in some cases a vehicle can come equipped with multiple navigation systems so that the user has the ability to select the one they would like to use.

SUMMARY OF THE INVENTION

According to one aspect of the present invention, there is provided a method of arbitrating between multiple vehicle navigation systems that are available to an occupant on board the vehicle. The method generally includes the steps of: (a) determining the operational status of at least one of first and second vehicle navigation systems, (b) if more than one of the vehicle navigation systems are currently activated, then selecting one of the vehicle navigation systems and running an active session for the selected vehicle navigation system while preventing an active session from running on the unselected vehicle navigation system.

According to another aspect of the invention, there is provided a method of arbitration that includes the steps of: (a) receiving an activation signal indicating that a first vehicle navigation system has been activated, (b) determining the operational status of a second vehicle navigation system, (c) if the second system is not currently activated, then running an active session for the first system, and (d) if the second system is currently activated, then determining which of the systems the occupant wishes to use by interacting with the occupant via an interface, such as a human/machine interface (HMI) or a graphical user interface (GUI) and thereafter using the selected system only to provide navigational directions.

In accordance with another aspect of the invention, there is provided a method for arbitrating between any of two or more vehicle-based sources of electronically-supplied audio speech, whether for navigation systems or otherwise. The method includes the steps of: (a) providing a vehicle occupant with information supplied in the form of audible speech, wherein the information is provided to the occupant using a first vehicle system that supplies audio speech signals to one or more speakers located within the vehicle; (b) receiving an activation signal via a vehicle network indicating that a second vehicle system that supplies audio speech signals has been activated; (c) selecting one of the first and second vehicle systems; and (d) allowing the selected vehicle system to supply audible speech to the occupant while preventing the unselected vehicle system from supplying audible speech to the occupant.

BRIEF DESCRIPTION OF THE DRAWINGS

A preferred exemplary embodiment of the invention will hereinafter be described in conjunction with the appended drawings, wherein like designations denote like elements, and wherein.

DETAILED DESCRIPTION OF THE PREFERRED EMBODIMENTS

In the event that multiple vehicle navigation systems are concurrently activated, the method discussed below arbitrates between them so that information is provided to the user by only one system at a time. This method of arbitration reduces the possibility of user confusion that could otherwise occur if multiple vehicle navigation systems were simultaneously providing information to the user.

Figure 1:
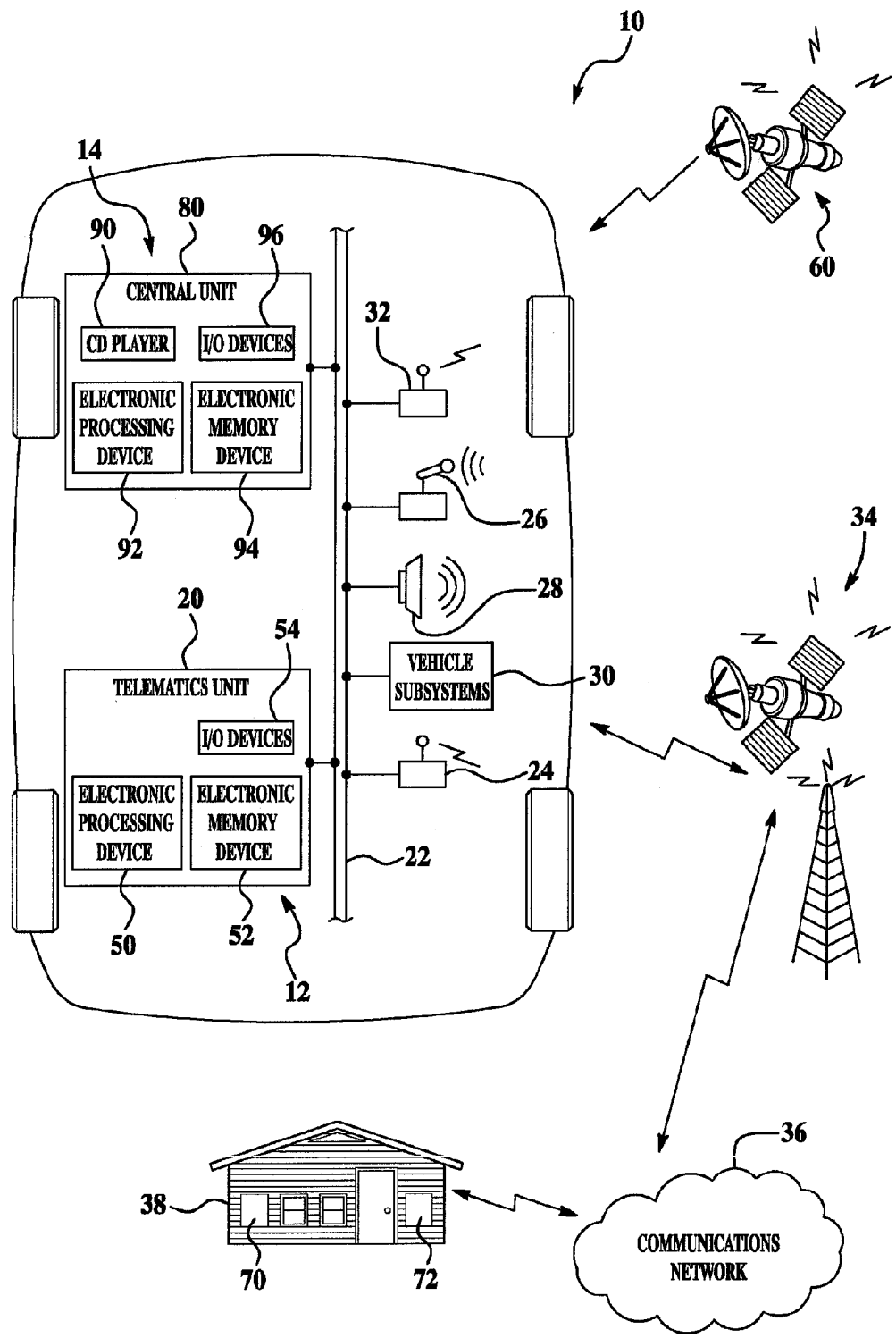
FIG. 1 is a block diagram of a system that is capable of utilizing the arbitration method of the present invention.

With reference to FIG. 1, there is shown an example of a system 10 that is capable of utilizing the arbitration method and generally includes a first vehicle navigation system 12 (telematics-based system) and a second vehicle navigation system 14 (autonomous, on-board system). It should be understood that the arbitration method described below can be used with any number of different vehicle navigation systems and is not specifically limited to the examples shown here. Moreover, the disclosed method can be used more generally to arbitrate between any combination of two or more vehicle systems that provide audible speech to the occupant and that use a vehicle network to at least provide activation information from one or both of the vehicle systems so that the method can electronically enable or disable the vehicle systems from supplying audible speech to the occupant. The vehicle systems can either be similar systems that provide the same type of information or instructions, such as in the case of multiple vehicle navigation systems, or can be two or more different types of systems that provide audible speech information, such as vehicle multi-media, diagnostic or safety systems, to name but a few.

The Telematics-Based Vehicle Navigation System—

Turning now to the exemplary telematics-based vehicle navigation system 12, this system transfers wireless voice and data information between hardware located on the vehicle and a call center in order to provide various navigation-related services. In this sense, telematics-based system 12 generally employs a client/server arrangement where the vehicle-integrated hardware acts as the client and the call center acts as the server. According to a preferred exemplary embodiment, telematics-based system 12 includes a telematics unit 20 integrated within the vehicle, a vehicle network bus 22, a number of different subsystems 24-32, a wireless carrier system 34, a communications network 36, and one or more call centers 38. Because telematics-based vehicle navigation systems are widely known in the art, only a brief description is provided here for background purposes.

Telematics unit 20 is generally considered the nucleus of the client side of telematics-based system 12 and interfaces with the various subsystems 24-32 via vehicle network bus 22. According to a preferred embodiment, telematics unit 20 generally includes an electronic processing device 50, an electronic memory device 52, I/O devices 54, and numerous other components known to those skilled in the art. The electronic processing device 50 can be implemented in the form of a microprocessor, microcontroller, host processor, vehicle communications processor, Application Specific Integrated Circuit (ASIC), or as any other appropriate processor type. Electronic processing device 50 executes a series of instructions that govern the operation of telematics unit 20 and are stored on electronic memory device 52 in the form of software or firmware. I/O devices 54 enable the telematics unit 20 to interface with one of a number of different components including subsystems 24-32 via the vehicle network bus 22.

Vehicle network bus 22 is the primary communications artery between telematics unit 20 and the various subsystems 24-32. According to a preferred embodiment, network bus 22 is provided in the form of a Controller Area Network (CAN) or a Local Area Network (LAN); for more information on the specifics of vehicle network buses, please see ISO Standards 11989, 11519 and SAE Standard J1850. Vehicle network bus 22 preferably couples telematics unit 20 to a wireless communications unit 24, a microphone 26, speakers 28, one or more vehicle subsystems 30, and a GPS receiver unit 32, to name but a few of the possible components with which the telematics unit may communicate.

Wireless communications unit 24 transmits and receives voice and data information with wireless carrier system 34 so that telematics unit 20 can communicate with call center 38. Wireless communications unit 24 is preferably equipped with both a wireless modem for data communication as well as an embedded cellular phone for voice communication; however, the wireless modem and cellular phone could be individually provided as separate components. Microphone 26 allows a user to provide voice commands or other verbal input into the telematics-based system 12 and can be equipped with an optional embedded voice processing unit utilizing one of numerous human/machine interface (HMI) technologies known in the art. Speakers 28 can either be stand-alone speakers specifically dedicated for use with telematics-based system 12 or they can be part of the vehicle audio system. In either event, speakers 28 enable telematics-based system 12 to communicate with the user through audible speech. Vehicle subsystems 30 broadly represent all of the subsystems throughout the vehicle with which the telematics-based system 12 can interact. For example, if call center 38 sends a call signal to unlock the vehicle doors, then telematics unit 20 instructs a door lock mechanism (which is one of the vehicle subsystems 30) to unlock the doors. It should be appreciated, however, that the door lock mechanism is only one example of a vehicle subsystem 30, as telematics unit 20 may communicate with numerous other subsystems located throughout the vehicle. GPS receiver unit 32 receives location and time data from GPS satellites 60 and conveys corresponding latitude and longitude information to the telematics unit 20.

Although the graphical depiction of FIG. 1 shows subsystems 24-32 separate from telematics unit 20, it is possible for any combination of these subsystems to be integrated within the telematics unit. For instance, instead of wireless communications unit 24 being separate from telematics unit 20 such that the two devices are coupled via the vehicle network bus 22, unit 24 could be provided as an integral part of the telematics unit. The same applies for the rest of subsystems 24-32, as well as other subsystems and components known in the art but not specifically shown here. Furthermore, telematics-based system 12 could include additional components not shown here or have some of the components shown here removed.

The wireless carrier system 34 conveys wireless signals between the wireless communications unit 24 located on the vehicle and communications network 36, and preferably comprises a cellular telephone network using CDMA, GSM or other suitable wireless communication technology. Alternatively, it can be implemented in other ways, such as a satellite-based communications system or as a combination of these, and thus, the wireless carrier system 34 is shown in FIG. 1 generally as a collection of base stations, towers and/or satellites. Communications network 36 connects wireless carrier system 34 to one or more base stations 38. Preferably, communications network 36 is a wired public-switched telephone system although it can include one of any number of different combinations of wired and wireless components. Because the specific wireless carrier system 34 and communications network 36 used herein are well known in the art, a further description is omitted.

Call center 38 generally functions as the server side of the client/server arrangement employed by telematics-based system 12, and provides telematics unit 20 with a variety of voice and data information. The call center can either be fully automated, staffed by employees, or operated according to some combination thereof and preferably includes telecommunications equipment 70, databases and other information storage devices 72, as well as other components known to those skilled in the art.

The Vehicle-Mounted Autonomous Navigation System—

The autonomous vehicle navigation system 14 uses road data stored locally on a CD, DVD or other electronically-readable storage medium along with the GPS-derived position of the vehicle, in order to determine the vehicle location and provide the user with turn-by-turn directions as well as other services. Unlike the telematics-based system just described, autonomous navigation system 14 does not require system back-end components such as wireless carrier system 34, communications network 36 and call center 38. According to the exemplary embodiment shown here, the autonomous navigation system is implemented as a CD-based system 14 which generally includes a central unit 80, the vehicle network bus 22 and the subsystems 26-32.

Central unit 80 is the primary piece of hardware for the CD-based vehicle navigation system and generally includes an input device 90 in the form of a CD player, an electronic processing device 92, an electronic memory device 94, and I/O devices 96. Input device 90 reads information from the CD so that the required road data can be compared to the GPS coordinates provided by GPS receiver unit 32. The input device 90 may be shared by the vehicle audio or entertainment system, or it can be an autonomous device dedicated to system 14 such that both systems can be used simultaneously. As with electronic processing device 50, electronic memory device 52 and the I/O devices 54 previously described, devices 92, 94 and 96 can be one of many different types of devices known to those skilled in the art. In general, electronic processing device 92 executes a series of software or firmware instructions residing on memory device 94 in order to generate driving routes or turn-by-turn instructions for the user.

CD-based vehicle navigation system 14 utilizes the subsystems 26-32 in a similar manner as that already described in conjunction with telematics-based system 12. For example, central unit 80 uses vehicle network bus 22 to obtain driver voice instructions from microphone 26 and send audible driving instructions and other information to the driver using electronically-supplied audio speech signals that are sent to speakers 28. While not necessary, it is possible for the CD-based system 14 to interface with one of a number of different vehicle subsystems 30 so that the navigation system can provide an array of additional services. As already mentioned, GPS receiver unit 32 gathers timing information from a GPS satellite constellation 60 and provides that information to central unit 80 via vehicle network bus 22.

Again, it is important to note that the telematics-based and CD-based systems 12 and 14 shown and described above are simply two examples of vehicle systems for which the arbitration method can be used. Accordingly, the arbitration method is not limited to these specific examples and could be used with one of numerous combinations of vehicle systems.

The Method of Arbitration—

Figure 2:
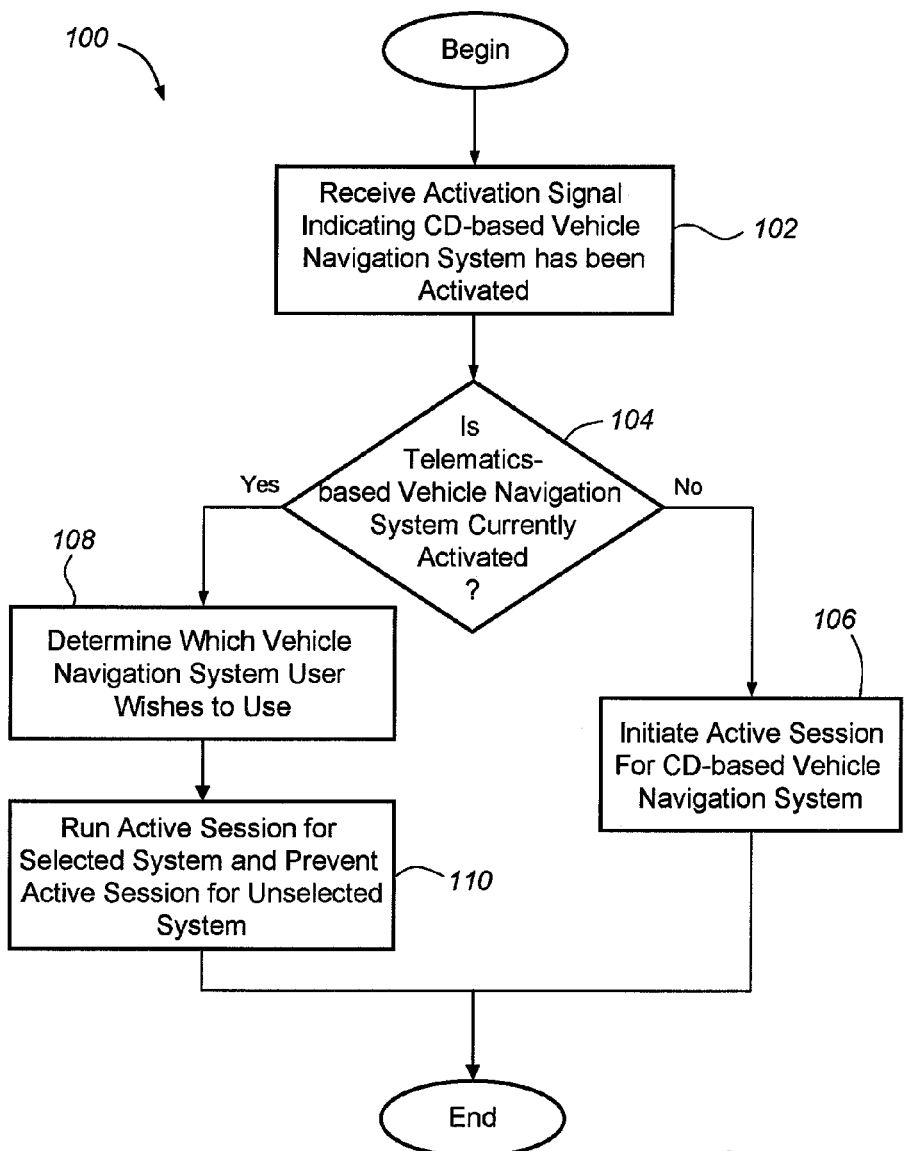
FIG. 2 is a flowchart showing some of the steps of an embodiment of the arbitration method.

With reference to FIG. 2, there is shown an embodiment of an arbitration method 100 that arbitrates between first and second vehicle navigation systems in order to avoid a situation where both systems are simultaneously providing a user with information. Arbitration method 100 is preferably implemented in the form of software or firmware instructions which can reside in the electronic memory devices of vehicle navigation system 12 and/or system 14. Thus, it is possible to store the arbitration method program only in electronic memory device 52, only in electronic memory device 94, in both memory devices such that either version can be executed, or in some other memory that is resident on the vehicle.

As used herein, the term 'activated' broadly refers to the state or condition where a vehicle navigation system has been manually, automatically or otherwise turned on. The term 'active session', on the other hand, broadly refers to a session of activity when a vehicle navigation system is activated and is providing the user with information, data, services, etc.; for example, a turn-by-turn directions session would be an active session. Thus, it is possible for a vehicle navigation system to be activated and not be running an active session, but if an active session is running then the vehicle navigation system must be activated.

According to this particular example, arbitration method 100 is stored in the electronic memory device 50 of telematics-based system 12 and is executed upon reception of an activation signal from system 14 indicating that the CD-based system has been activated. Preferably, telematics-based system 12 is automatically activated when the vehicle is turned on, although this is not necessary. Subsequent activation of CD-based system 14 generates the activation signal and can occur in response to either a user manually engaging the CD-based system or the system being automatically turned on. As previously mentioned, it is this activation signal that preferably initiates arbitration method 100.

Because it is possible for the telematics-based system 12 to be turned off after being automatically activated, step 104 determines the current operational status of system 12; i.e.— is the telematics-based system currently activated. A number of different techniques can be used to determine the operational status of telematics-based system 12, including a first technique where step 104 determines the operation status simply by querying the system. Alternatively, telematics-based system 12 could be designed to periodically send a signal indicating its operational status so that a query is not necessary. Furthermore, system 12 could be set up like system 14, such that upon initial activation of the system it sends out an activation system indicating its recent activation. Any one of these and other techniques known to those skilled in the art could be used to determine the operational status of either vehicle navigation system 12 or 14.

If step 104 determines that telematics-based system 12 is not activated, then step 106 initiates an active session for CD-based system 14. In this case, there is no need to determine which vehicle navigation system the user wants to use, as CD-based system 14 is the only vehicle navigation system that is currently activated. If, on the other hand, step 104 determines that telematics-based system 12 is currently activated as well, then arbitration method 100 must determine which of the two navigation systems the user wishes to use, step 108. According to a preferred technique, step 108 utilizes microphone 26 and speakers 28 to communicate with the user via a verbal human/machine interface (HMI) so that the user can select which of the navigation systems they wish to use. This interface may be short and simple or it may be part of a larger, more involved decision tree that is used to acquire additional information needed by the system. There are various technologies known to those skilled in the art for establishing and conducting an HMI such as this, and will therefore not be reiterated here. According to another technique, step 108 uses a graphical user interface (GUI) in order to determine the user's navigation system selection. If a GUI is used, then a graphical display unit (not shown) would also need to be included within system 10. It is also possible for step 108 to utilize stored predetermined selections or stored past selections when determining which navigation system is to be used. If this approach is employed, the process of querying the user via either the HMI or GUI could be bypassed altogether.

Once a decision has been made as to which vehicle navigation system is to be used, step 110 runs an active session for the selected vehicle navigation system and prevents an active session from running on the unselected system. In the event that telematics-based system 12 is selected, which in this particular example is already running an active session, then step 110 can either allow the current active session to continue running or it can initiate a new active session. Step 110 also prevents CD-based system 14 from running an active session and, depending on the particular setup of the system, can deactivate unselected system 14. Conversely, if CD-based system 14 is selected, then step 110 initiates a new active session on that system and cancels the current active session running on telematics-based system 12 so that another active session is prevented from running. In either event, only one vehicle navigation system at a time should be running an active session when method 100 is exited. This reduces the likelihood of user confusion attributed to competing directions provided by multiple navigation systems.

If telematics-based system 12 was already activated when method 100 began, then it is preferable that it continue running during the execution of steps 102-108, regardless if it is selected. This way, even if CD-based system 14 is ultimately selected, it will provide directions or other output to the user in the meantime. It should be recognized that while the above example discloses activating telematics-based system 12 first, followed by an activation of CD-based system 14, the arbitration method of the present invention is not limited to that particular exemplary arrangement. Indeed, the CD-based system or another type of vehicle navigation system known in the art could be the first vehicle navigation system to be activated, just as the telematics-based system or another appropriate system could be the second vehicle navigation system to be activated.

It is to be understood that the foregoing description is not a description of the invention itself, but of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example", "for instance" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. An electronically-controlled method of arbitrating between separate vehicle navigation systems that are available to an occupant on board a vehicle, comprising the steps of:

(a) determining the operational status of at least one of first and second vehicle navigation systems that are accessible to the occupant in order to determine if more than one of said separate vehicle navigation systems are currently activated, wherein said first vehicle navigation system is a telematics-based vehicle navigation system and said second vehicle navigation system is an autonomous vehicle navigation system that is separate from said first vehicle navigation system;

(b) if more than one of said separate vehicle navigation systems are currently activated, then:

(b1) selecting one of said separate vehicle navigation systems;

(b2) running an active session for the selected vehicle navigation system so that the selected vehicle navigation system provides the occupant with navigation-related services; and (b3) preventing an active session from running on the unselected vehicle navigation system so that the unselected vehicle navigation system is prevented from providing the occupant with navigation-related services, wherein only one of said separate vehicle navigation systems is running an active session at a time.

2. The method of claim 1, wherein said first and second vehicle navigation systems are integrated with the vehicle electronics by being coupled to a vehicle network bus.

3. The method of claim 1, wherein said operational status of said step (a) is determined from a query of at least one of said first and second vehicle navigation systems.

4. The method of claim 1, wherein said operational status of said step (a) is determined from an activation signal that is generated when one of said first and second vehicle navigation systems is activated.

5. The method of claim 1, wherein said operational status of said step (a) is determined from a signal that is periodically sent by at least one of said first and second vehicle navigation systems.

6. The method of claim 1, wherein step (b1) utilizes a verbal human/machine interface (HMI) to determine which of said vehicle navigation systems the occupant wishes to use.

7. The method of claim 1, wherein step (b1) utilizes a graphical user interface (GUI) to determine which of said vehicle navigation systems the occupant wishes to use.

8. The method of claim 1, wherein step (b1) utilizes stored, predetermined selections to determine which of said vehicle navigation systems the occupant wishes to use.

9. The method of claim 1, wherein step (b1) utilizes one or more past selections to determine which of said vehicle navigation systems the occupant wishes to use.

10. The method of claim 1, wherein said method arbitrates between said first and second vehicle navigation systems and at least one additional system.

11. A method of arbitrating between separate vehicle navigation systems that are available to an occupant on board a vehicle, comprising the steps of:

(a) receiving an activation signal indicating that a first vehicle navigation system has been activated;

(b) determining the operational status of a second vehicle navigation system that is separate from said first vehicle navigation system;

(c) if said second vehicle navigation system is not currently activated, then running an active session for said first vehicle navigation system and providing the occupant with navigation-related services from said first vehicle navigation system; and (d) if said second system is currently activated, then determining which of said first and second vehicle navigation systems the occupant wishes to use by interacting with the occupant via an interface and receiving a selection from the occupant:

i) if the occupant selects said second vehicle navigation system, then ignoring said activation signal and preventing said first vehicle navigation system from providing the occupant with navigation-related services; and ii) if the occupant selects said first vehicle navigation system, then running an active session for said first vehicle navigation system and providing the occupant with navigation-related services from said first vehicle navigation system, and preventing said second vehicle navigation system from running an active session and refraining from providing the occupant with navigation-related services from the second vehicle navigation system, so that only one of said first and second vehicle navigation systems is running an active session at a time.

12. The method of claim 11, wherein said interface of step (d) is a verbal human/machine interface (HMI).

13. The method of claim 11, wherein said interface of step (d) is a graphical user interface (GUI).

* * * * *